United States Patent Office 3,839,530
Patented Oct. 1, 1974

3,839,530
PRODUCTION OF POLYCAPROAMIDE FIBER
Alex John Bingham, Lake Hiawatha, N.J., and David Pendlebury, Chester, and Stanley David Lazarus, Petersburg, Va., assignors to Allied Chemical Corporation, New York, N.Y.
No Drawing. Filed Nov. 27, 1973, Ser. No. 419,318
Int. Cl. C08g 20/14; D01f 1/02; D02g 1/00
U.S. Cl. 264—210 F                    10 Claims

ABSTRACT OF THE DISCLOSURE

It has been suggested that a high strength polycaproamide fiber having excess number of carboxyl end groups over amino end groups can be produced by melt spinning a polymer prepared by polymerizing ε-caprolactam and reacting the polymer with a dibasic carboxylic acid containing at least six carbon atoms. However, with incorporation of this dicarboxylic acid reactant in continuous operation, serious problems have been encountered in melt-spinning of the polymer due to the frequent occurrence of "nubs" or enlarged places in the extruded polyamide filament. It has now been found that the occurrence of said nubs in the fiber can be greatly reduced by utilizing certain esters of the dicarboxylic acid and reacting the ester at the end of the polymerization. Moreover, dyeing properties of the fiber may be more readily controlled.

BACKGROUND OF THE INVENTION

This invention relates to a process for the melt-spinning of a filamentary structure from a synthetic polyamide polymer. More particularly, it is concerned with a continuous process for the formation of high strength polycaproamide filament, yarn or the like by melt-spinning a synthetic linear fiber-forming polycaproamide having excess number of carboxyl end groups over amino end groups.

U.S. Pat. 2,174,527 discloses that dibasic dicarboxylic acids when employed in excess in a diacid-diamine polyamide, serve to terminate the polymer, thereby minimizing further increase in polymer molecular weight.

U.S. Pat. 2,241,321 teaches polymerization of caprolactam in the presence of a diamine, followed by addition of sebacic acid and completion of the polymerization. The sebacic acid apparently acts as a chain-extending agent.

More recently, U.S. Pat. 3,386,967 discloses that a high strength polycaproamide yarn having an excess number of carboxyl end groups over amino end groups may be produced from a high molecular weight polymer prepared by polymerizing ε-caprolactam and reacting the polymer with a dibasic carboxylic acid containing at least six carbon atoms. Because polycondensation of the polymer in the presence of a dibasic carboxylic acid is relatively slow, the acid is desirably included at the start of the polymerization reaction. Even so, equilibrium is approached in the polymerization reaction mixture at number average molecular weight not above about 20,000 under usual polymerization conditions, and special measures are required to carry the reaction further. One particularly useful method of accomplishing the required further reaction is to remove volatile by-products of the polymerization such as water by flowing an inert gas across the reaction mixture surface, desirably followed by application of vacuum.

Although the process of U.S. Pat. 3,386,967 constitutes a major contribution to this art, we have found that in continuous operation of the process on a commercial basis, particularly at maximum production rates, serious problems have been encountered in melt spinning due to the frequent occurrence of "nubs" in the fiber. The term "nubs" is conventionally applied and is used herein to mean enlarged sections of filament no more than several filament diameters in length. Nubs may be formed by a foreign, non-orientable substance which interferes with normal fiber stretch in a short section, resulting in an enlargement. Foreign substances which are believed to have contributed to nubs in the present instance include carbonized polymer and gels formed in the polymer. Gels appear to be the chief cause, i.e., the nubs are probably created by non-orientable gel from cross-linked polymer. Thermal degradation of the polymer may be an important causative factor.

The reactions in thermal degradation of polyamides containing dicarboxylic acid additives are not entirely understood. It is likely that thermal degradation produces a decomposition product which serves to form cross-links between amide groups and adjacent polymer chains. The decomposition reaction proceeeds slowly, finally building up a three-dimensional network of molecules which may be called polymer gel and which eventually reaches the stage where it forms an infusible coating on the walls of the equipment.

A serious difficulty which arises from the formation of this polymer gel on the interior walls is that from time to time pieces break off and get into the flowing polymer stream where they produce damage to the spinning equipment.

The greatest difficulty, however, is caused by polymer gel which has progressed to the three-dimensional structural stage, but which has not yet reached the stage of being infusible. This kind of polymer gel is readily carried with the stream of flowing polymer. Being still molten or at least softened, it passes through the pump and even through the filter medium to show up either as discontinuities or as viscosity differences in the spun filament. When these filaments are later drawn, these defects may cause breaks in the filaments which either cause the whole thread to break or else form nubs which go through to be counted as quality defects in the final yarns.

SUMMARY OF THE INVENTION

It is an object of this invention to avoid the above difficulties by minimizing gel formations in the molten polyamide. Another object is to avoid accumulation of polymer gel on the walls of the reactor, in the pump, or in the filtering medium when melt-spinning the polyamide. A further object is to improve the uniformity and quality of filaments or fibers formed from the molten polymer; in particular to minimize nub formation in the filaments. Other objects will become apparent from the disclosure and the appended claims.

These objects are accomplished by the present invention which provides an improvement in the process for the formation of ε-polycaproamide fiber from a fiber-forming ε-polycaproamide polymer having excess number of carboxyl end groups over amino end groups, involving extruding the molten polymer through an orifice into a quenching medium and thereafter stretching the resulting filament, the improvement comprising:

(a) continuously forming a molten polymerization reaction mixture at 240°–290° C. from ε-caprolactam, said polymerization preferably being initiated by water;
(b) continuously smoothly stirring said reaction mixture while flowing over the surface thereof a gas capable of removing moisture from said reaction mixture, at a flow rate of at least 2 unit volumes of said gas, measured at standard temperature and pressure, per hour per each unit volume of said reaction mixture, until the total primary amino group plus carboxyl group analysis of the resulting polymer is not above 135 milliequivalents per kilogram of polymer; and then (c) continuously reacting said polymer at 250°–290° C. with about 0.1–0.7 mol, preferably about 0.2–0.4 mol, per 100 mols of lactam in the polymer, of an ester of a dicarboxylic acid, having the formula

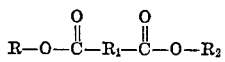

where R is a hydrocarbon radical having between 9 and 16 carbon atoms, $R_1$ is a hydrocarbon radical having between 4 and 18 carbon atoms, and $R_2$ is hydrogen or a hydrocarbon radical having between 9 and 16 carbon atoms, until the primary amino group analysis of the polymer is not above 34 milliequivalents, preferably not above 20 milliequivalents, per kilogram of polymer and the carboxyl group analysis of the polymer is between about 50 and about 90 milliequivalents per kilogram of polymer, thereby reducing the occurrence of nubs in the fiber.

As indicated hereinabove, the present invention may be considered an improvement over the disclosure of U.S. Pat. 3,386,967 which is incorporated herein by reference.

The esters employed in the present invention are known compounds, and some are commercially available. The dicarboxylic acid substituent of the esters can be aliphatic, alicyclic, aromatic, or alkyl-aromatic, and must contain at least 6 carbon atoms. Representative suitable species include aliphatic acids such as adipic, pimelic, suberic, azelaic, sebacic, undecanedioic and tetradecanedioic; aromatic dicarboxylic acids such as terephthalic acid, alicyclic species such as cyclohexane 1,4-dicarboxylic acid; and alkyl-aromatic species such as 4-carboxy phenyl acetic acid. The dicarboxylic acid can contain substituent groups which are non-reactive with amine or carboxyl groups in the course of the polymerization reaction. In general, the dibasic acid must be thermally stable and non-volatile under the conditions of polymerization, and will suitably contain 6–20 carbon atoms per molecule. The alcohol substituent of the esters can be aliphatic, alicyclic, aromatic, or alkyl-aromatic and will suitably contain 9–16 carbon atoms. The alcohol substituent must be of sufficiently high molecular weight so that it will not flash out of the polymer at the spinnerettes. Representative suitable species include nonyl alcohol, decyl alcohol, lauryl alcohol ($C_{12}H_{25}OH$), and cetyl alcohol ($C_{16}H_{33}OH$).

DESCRIPTION OF THE PREFERRED EMBODIMENT

The invention will now be further described in the following specific examples which are to be regarded solely as illustrative and not as restricting the scope of the invention. All parts and percentages are by weight unless otherwise indicated.

Example 1

Over a period of about 12 weeks, about 100 parts per hour of ε-caprolactam was continuously fed to a stirred reactor operating at a temperature of 265° C., together with steam at a pressure of about 50 p.s.i.g. to form a prepolymer melt. A trace amount of copper compound soluble in the reaction mixture was incorporated in the reaction mixture as heat stabilizer.

Polymerization was continuously accomplished in a series of three stirred reactors operated at conditions described in U.S. Pat. 3,109,831 to Apostle, i.e., the water and part of the unreacted lactam was continuously removed from the prepolymer melt by smoothly stirring the reaction melt at about atmospheric pressure at a temperature of about 265° C. while sweeping the surface of the smoothly stirred reaction mixture with dry nitrogen gas at a rate of about 3–4 unit volumes of gas measured at standard temperature and pressure (STP) per hour per unit volume of the reaction mixture, for approximately 4 hours. The final reactor may be operated at reduced pressure if desired.

The resulting polymer was continuously extruded into a warm water bath and chopped into pellets 1/10 by 1/10 inch in size. The pellets were then hot water washed at 100° C. to reduce the content of hot water soluble constituents to about 1–2%; and the pellets were dried to less than 0.1% moisture. The polymer was a white solid having a relative viscosity of about 55 to 60 as determined by concentration of 11 grams of polymer in 100 milliliters of 90 percent formic acid at 25° C. (ASTMD–789–62T). The total primary amino group plus carboxyl group analysis of the polymer was 104 milliequivalents per kilogram of polymer. The polycaproamide pellets were melted at 260°–285° C. and reacted for 3.5 minutes with about 0.2 mol of dilauryl sebacate per 100 mols of lactam in the polymer, then melt-extruded under a pressure of about 1500 p.s.i.g. through a 70-orifice spinnerette to produce 3900-denier fiber. The fiber was then collected and drawn about 3 times its extruded length to produce a 1300-denier yarn. For convenience, this yarn hereinafter will be called Yarn A. The polymer of Yarn A had a total primary amino group plus carboxyl group analysis of 78 milliequivalents per kilogram of polymer and a primary amino group analysis of 18 milliequivalents per kilogram of polymer.

In order to provide for comparative testing of polycaproamide made with a dicarboxylic acid additive, Yarn B having about the same total primary amino group plus carboxyl group analysis and primary amino group analysis per kilogram of polymer as Yarn A was prepared by the general procedure of this example except that sebacic acid at a concentration of 0.2 mol percent of the lactam in the polymerization reaction mixture was fed to the prepolymer reactor with the ε-caprolactam. Yarn A and Yarn B both showed a good tensile strength of about 9.5 grams per denier. Yarn A and Yarn B were also tested for the number of nubs per pound as shown in Example 2.

Example 2

This example outlines the method used for locating, identifying and calculating the nubs per pound in Yarn A and Yarn B as prepared in Example 1. In this method a nub is defined as an enlarged place in a filament which is no more than several filament diameters in length. This method may be used for either monofilament or multifilament yarns; however, it is not applicable to most types of crimped yarn.

In accordance with the test, the 1300-denier yarn is drawn directly from the package by means of an air aspirator and is passed through an opening of known width, specifically, 0.006 inch in width. Such an opening is conveniently provided by use of a ceramic cleaner gap, which is well-known in the art. The presence of a nub is detected when it stops the yarn passage through the opening. The filaments are separated and the cause of the yarn stopping identified as a nub or as the twisted end of a broken filament. For representative results, about 10 pounds of yarn is passed through the gap and the number of nubs counted. Table I below shows the results of testing on Yarn A and Yarn B.

TABLE 1

Determination of Nubs per Pound

| Sample | Average Nub Count per Pound of Yarn |
|---|---|
| Yarn A | 3.9 |
| Yarn B | 14.1 |

The individual standard deviation in this test was 1.79 nubs per pound of yarn, so that the standard deviation of the average for the 10-pound sample was about 0.565 nubs per pound. Accordingly, the difference between the two averages, i.e., 10.2 nubs per pound, was statistically significant at the 99.9% level of significance.

Example 3

A yarn was produced according to the procedure of Example 1 except that the polymerization reaction was initiated with 5 parts of aminocaproic acid instead of steam and 0.2 mol of didecyl terephthalate was used instead of the dilauryl sebacate. The polymer of the resulting yarn had a total primary amino group plus carboxyl group analysis of 79 milliequivalents per kilogram of polymer and a primary amino group analysis of 18 milliequivalents per kilogram of polymer. The average nub count of the yarn was 3.7 per pound of yarn.

Example 4

A yarn was produced according to the procedure of Example 1 except that the polycaproamide pellets were melted at 260°–280° C. and reacted for 2.3 minutes with 0.2 mol of dilauryl sebacate per 100 mols of lactam in the polymer. The polymer in the resulting yarn had a total primary amino group plus carboxyl group analysis of 82 milliequivalents per kilogram of polymer and a primary amino group analysis of 28 milliequivalents per kilogram of polymer. The average nub count of the yarn was 2.5 per pound of yarn.

Example 5

A yarn was produced according to the procedure of Example 1 except that the polycaproamide pellets were melted at about 270° C. and reacted for 1.6 minutes with 0.2 mol of dialuryl sebacate per 100 mols of lactam in the polymer. The polymer in the resulting yarn had a total primary amino group plus carboxyl group analysis of 87 milliequivalents per kilogram and a primary amino group analysis of 34 milliequivalents per kilogram of polymer. The average nub count of the yarn was 2.8 per pound of yarn.

EXAMPLE 6

A yarn was produced according to the procedure of Example 1 except that the polycaproamide pellets were melted at about 265° C. and reacted for 3 minutes with 0.3 mole of dilauryl terephthalate per 100 mols of lactam in the polymer. The polymer in the resulting yarn had a total primary amino group plus carboxyl group analysis of 80 milliequivalents per kilogram of polymer and a primary amino group analysis of 18 milliequivalents per kilogram of polymer. The average nub count of the yarn was 2.9 per pound of yarn.

Example 7

A yarn was produced according to the procedure of Example 1 except that the polycaproamide pellets were melted at about 265° C. and reacted for 3.5 minutes with 0.1 mole of dilauryl sebacate and 0.1 mole of monolauryl sebacate per 100 mols of lactam in the polymer. The polymer in the resulting yarn had a total primary amino group plus carboxyl group analysis of 95 milliequivalents per kilogram of polymer and a primary amino group analysis of 25 milliequivalents per kilogram of polymer. The average nub count of the yarn was 2.8 per pound of yarn. When dyed with an acid dye, e.g., Lissamine Fast Red B (Acid Red 37), the yarn was dyed a deeper shade than Yarn A of Example 1. Thus, considerable flexibility can be built into a dyeing system by reacting the polycaproamide with the terminating esters of the instant invention, e.g., from a single polycaproamide polymer, deep, medium and light dye polymers can be obtained using the appropriate concentrations of diester and half ester. Further flexibility in dyeing can be achieved by utilizing an amine terminated polycaproamide and reacting it with an ester in accordance with the present invention.

We claim:

1. In a process for the formation of polycaproamide fiber from a fiber-forming ε-polycaproamide polymer having excess number of carboxyl end groups over amino end groups, by extruding the molten polymer through an orifice into a quenching medium and thereafter stretching the resulting filament, the improvement wherein said fiber-forming ε-polycaproamide polymer is prepared by a process comprising:

(a) continuously forming a molten polymerization reaction mixture at 240°–290° C. from ε-caprolactam;

(b) continuously smoothly stirring said reaction mixture while flowing over the surface thereof a gas capable of removing moisture from said reaction mixture, at a flow rate of at least 2 unit volumes of said gas, measured at standard temperature and pressure, per hour per each unit volume of said reaction mixture, until the total primary amino group plus carboxyl group analysis of the resulting polymer is not above 135 milliequivalents per kilogram of polymer; and then (c) continuously reacting said polymer at 250–290° C. with about 0.1–0.7 mol per 100 mols of lactam in the polymer, of an ester of a dicarboxylic acid, having the formula

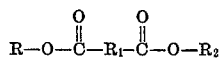

where R is a hydrocarbon radical having between 9 and 16 carbon atoms, $R_1$ is a hydrocarbon radical having between 4 and 18 carbon atoms, and $R_2$ is hydrogen or a hydrocarbon radical having between 9 and 16 carbon atoms, until the primary amino group analysis of the polymer is not above 34 milliequivalents per kilogram of polymer and the carboxyl group analysis of the polymer is between about 50 and about 90 milliequivalents per kilogram of polymer, thereby reducing the occurrence of nubs in the fiber.

2. The process of claim 1 wherein the polymerization is initiated in step (a) by water, and the proportion of ester reacted in step (c) is about 0.2–0.4 mol per 100 mols of lactam in the polymer.

3. The process of claim 1 wherein the reaction in step (c) is continued until the primary amino group analysis of the polymer is not above 20 milliequivalents per kilogram of polymer.

4. The process of claim 1 wherein the ester of dicarboxylic acid has the formula

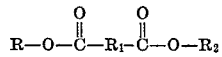

where R is a hydrocarbon radical having between 9 and 16 carbon atoms, $R_1$ is a hydrocarbon radical having between 4 and 18 carbon atoms, and $R_2$ is a hydrocarbon radical having between 9 and 16 carbon atoms.

5. The process of claim 4 wherein the polymerization is initiated in step (a) by water, and the proportion of ester reacted in step (c) is about 0.2–0.4 mol per 100 mols of lactam in the polymer.

6. The process of claim 4 wherein the reaction in step (c) is continued until the primary amino group analysis of the polymer is not above 20 milliequivalents per kilogram of polymer.

7. The process of claim 4 wherein the ester is dilauryl sebacate.

8. The process of claim 4 wherein the ester is didecyl terephthalate.

9. The process of claim 1 wherein the ester of dicarboxylic acid is a mixture of diester and monoester.

10. The process of claim 1 wherein the ester of dicarboxylic acid consists of about 50 mol percent dilauryl sebacate and about 50 mol percent monolauryl sebacate.

References Cited

UNITED STATES PATENTS

| | | | |
|---|---|---|---|
| 2,281,961 | 5/1942 | Ufer et al. | 260—78 |
| 2,557,808 | 6/1951 | Walker | 260—78 |
| 3,386,967 | 6/1968 | Twilley | 260—78 |
| 3,475,387 | 10/1969 | Carter et al. | 260—78 |

(Other references on following page)

OTHER REFERENCES

Chem. Absts., 56: 13043c (1962), Piceu.

Chem. Abstrs., 72: 67705p (1970), Toyo Rayon Co., Ltd.

Defensive Publication, T878017, publ. Sept. 29, 1970, 878 O.G. 1148, Shwed et al., 260/210f.

WILLIAM SHORT, Primary Examiner

E. WOODBERRY, Assistant Examiner

U.S. Cl. X.R.

260—78 L, 78 S, 78 SC; 264—211